United States Patent [19]
Clingman et al.

[11] 3,904,316
[45] Sept. 9, 1975

[54] TURBINE ROTOR WITH SLOT LOADED BLADES AND COMPOSITE BANDS

[75] Inventors: David L. Clingman, Carmel; Berton Schechter, Indianapolis; Marvin Herman, Indianapolis; George R. Sippel, Indianapolis, all of Ind.

[73] Assignee: General Motors Corporation, Detroit, Mich.

[22] Filed: Aug. 16, 1974

[21] Appl. No.: 497,869

[52] U.S. Cl. .............................................. 416/218
[51] Int. Cl.² ............................................. F01D 5/32
[58] Field of Search ................. 416/218, 215, 198 A

[56] References Cited
UNITED STATES PATENTS

| | | | |
|---|---|---|---|
| 3,252,687 | 5/1966 | Beck et al. | 416/218 X |
| 3,554,667 | 1/1971 | Wagle | 416/218 X |
| 3,610,772 | 10/1971 | Wagle | 416/218 X |
| 3,625,634 | 12/1971 | Stedfeld | 416/218 X |
| 3,813,185 | 5/1974 | Bouiller et al. | 416/218 X |

FOREIGN PATENTS OR APPLICATIONS

| | | | |
|---|---|---|---|
| 191,036 | 1967 | U.S.S.R. | 416/218 |
| 266,970 | 5/1950 | Switzerland | 416/218 |

*Primary Examiner*—Everette A. Powell, Jr.
*Attorney, Agent, or Firm*—Robert M. Sigler

[57] ABSTRACT

A turbine rotor comprises a plurality of annular members joined together in axial alignment, each annular member having a circumferential blade retention slot and an associated blade loading notch. A plurality of turbine blades, each with a base portion retained in the slot, project radially outward in a circumferential ring from each annular member; and a pair of notch filler members are inserted in each notch over the base portion of the adjacent turbine blade. The rotor includes a plurality of annular bands of composite material including circumferentially oriented fibers, each band being wrapped around the outside of a pair of adjacent annular members and extending axially between two adjacent rings of turbine blades. The composite bands, placed in circumferential tension and supported across the notches by the notch filler members, help retain the turbine blades within the blade retention slots and limit radial expansion of the annular members at high temperatures and rotational speeds.

1 Claim, 2 Drawing Figures

3,904,316

TURBINE ROTOR WITH SLOT LOADED BLADES AND COMPOSITE BANDS

SUMMARY OF THE INVENTION

Our invention is directed generally to turbomachine rotors and particularly to strong, lightweight, low inertia rotors for turbomachines such as axial flow compressors and turbines. In particular, our invention combines the lightweight strength of fibrous composite wraps with the ease of assembly and repair of plural rotor elements and slot loaded blades.

In addition, our invention uses certain filler members which are placed over the roots of the blades in blade loading notches of the rotor, which filler members are at least partially covered by the fibrous composite wraps. These filler members, having an outer surface flush with that of the rotor, support that portion of the fibrous composite wrap spanning the filler notch and simultaneously cooperate with the fibrous composite wrap to retain the blades securely within the slots.

The details of our invention and the advantages thereof will be clear to those skilled in the art from the following description of the preferred embodiment and the accompanying drawings.

DESCRIPTION OF THE PREFERRED EMBODIMENT

Figure 1:
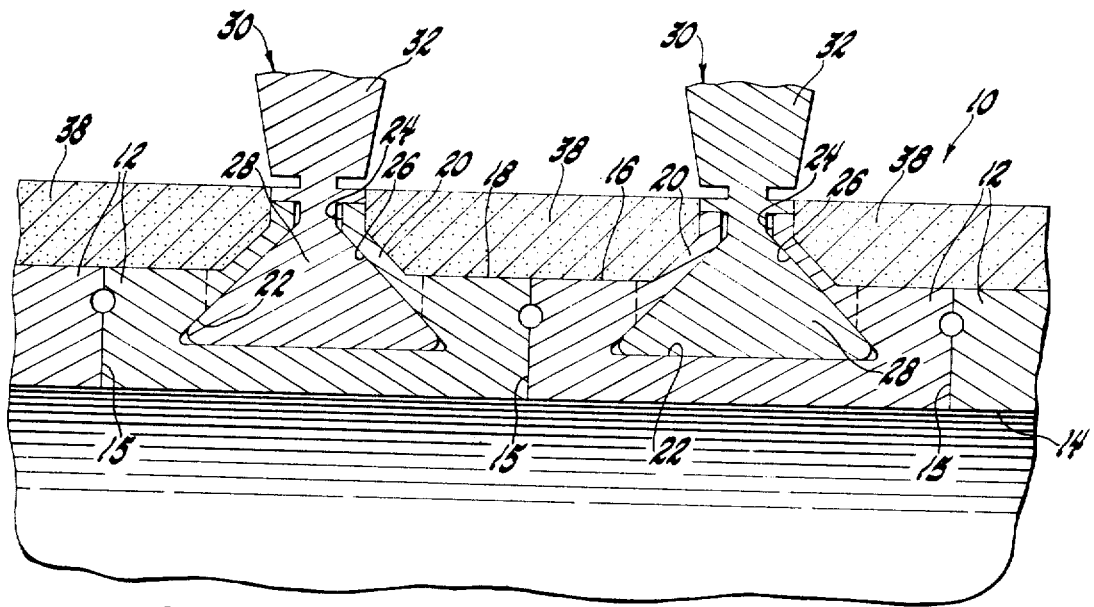
FIG. 1 is a sectional view of a portion of a drum rotor according to our invention taken in a plane containing the axis thereof.
Figure 2:
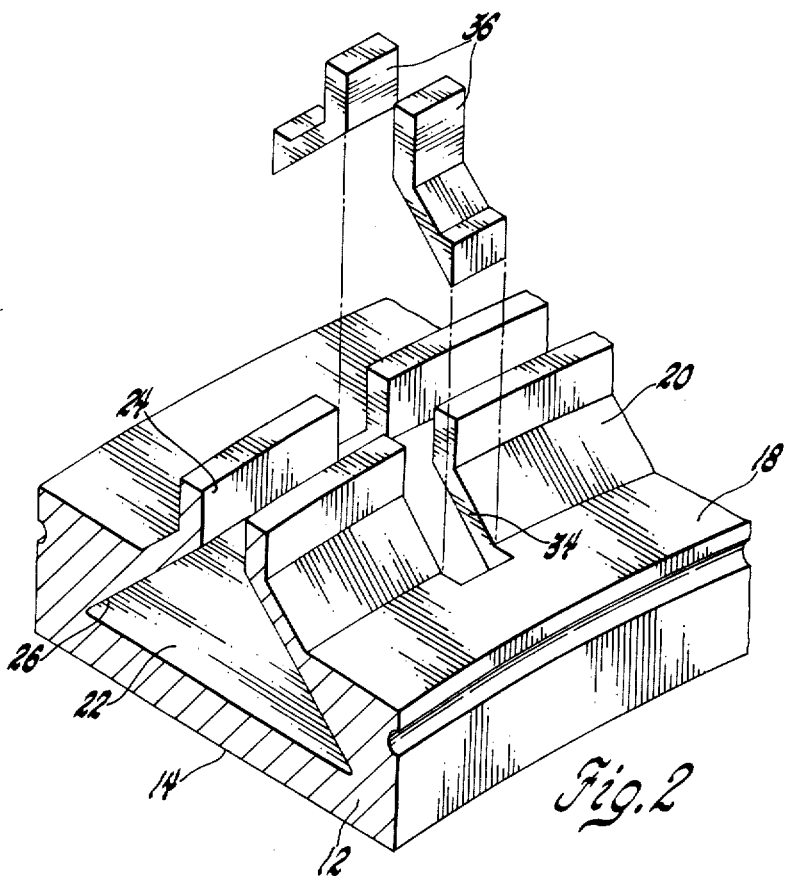
FIG. 2 is a fragmentary axonometric view of the rotor of our invention.

Referring to FIG. 1, a turbine rotor 10 includes a number of annular members or rings 12 of a metal such as titanium which are joined in axial alignment by being plasma arc welded where their inner surfaces 14 meet as at 15. The outer surface 16 of each ring 12 begins at each axial end in a flat ledge 18 which extends axially inward toward a circumferential flange 20 which, in turn, extends axially inward and radially outward at an angle to flat ledge 18, which could be, for example, 45°. A blade retention slot 22 in ring 12 opens through a circumferential opening 24 defined between the flanges 20. Slot 22 is triangular in cross section with a base parallel to the axis of ring 12 and an opposite apex at the circumferential opening 24. The upper sides of the triangle are formed by the inner surfaces 26 of the flanges 20.

Blade retention slot 22 is filled throughout its circumference with the base portions 28 of turbine blades 30. Each base portion 28 is triangular in cross section to correspond with the shape of slot 22 and fits snugly therein. Each turbine blade 30 has a blade portion 32 which projects radially outward from base portion 28 through the opening 24. The blade portion 32 can be of any well known shape, size and material. The base portions 28 of adjacent blades 30 are packed tightly in abutting relationship with one another so that the blade portions 32 from a circumferential row of blades around ring 12. Since each ring 12 has such a row of blades, the number of rings 12 in the rotor 10 determine the number of compressor or turbine stages.

Blades 30 are loaded into slot 22 through a loading notch 34 formed at one point along slot 22 by removing corresponding portions of each flange 20 at that point. The base portion 28 of each blade 30 can be dropped through loading notch 34 and then pushed circumferentially into abutting relationship with the base portion 28 of the blade 30 preceding it into the slot 22. When the slot 22 is completely filled with base portions 28 of blades 30, a pair of notch filler members 36 are inserted into loading notch 34, one on either side of theh adjacent blade 30. Filler members 36 are basically the same size and shape as the material that had to be removed from flange 20 and ledge 18 to form loading notch 34. Thus, with filler members 36 inserted, the outer surfaces of ledge 18 and flange 20 are smooth and flush across the filler members 36 in notch 34.

Each slot 22 being filled with blades 30, each notch 34 being filled with filler members 36 and the rings 12 being welded together into a unit, a band 38 of a composite material is formed around the outer surface 16 of the rotor between each adjacent pair of turbine blade rows and between the end rows of blades 30 and the axial ends of the rotor 10. Composite bands 38 contain fibers oriented in the circumferential direction to give the band great tensile strength in that direction. Bands 38 extend axially completely across the space between adjacent rows of blades 30 so that they cover the angled portions of flanges 20 as well as ledges 18. Composite bands 38, being of high modulus, smaller density and lower coefficient of expansion than rings 12, serve to restrict the radial expansion of rings 12 under conditions of high heat and great rotational speed. This allows the turbomachine to be designed with a smaller clearance between the ends of the blades 32 and the housing enclosing them and thus increases the efficiency of the machine of which rotor 10 is a part.

Composite band 38 also holds filler members 36 tightly in place and thus helps retain the turbine blades 30 in their proper relationship within slot 22. In turn, filler members 36 continue an unbroken outer surface 16 around which composite band 38 is formed so that no harmful bending stresses are created in band 38 where it would otherwise span filler notch 34.

We claim;

1. A turbine rotor assembly comprising, in combination:

a plurality of annular members joined together in axial alignment, each annular member having a blade retention slot extending circumferentially around the outer surface thereof and a blade loading notch for inserting turbine blades in the blade retention slot;

a circumferential row of turbine blades projecting radially outward from each annular member, each turbine blade having a base portion retained in the blade retention slot;

one or more filler members inserted in each blade loading notch radially outward of the adjacent turbine blade base portion, each filler member having a surface continuing the surface of the annular member across the loading notch;

a circumferential band of composite fibrous material encircling the annular members between each adjacent pair of turbine blade rows, the bands being supported across the blade loading notches by the filler members, the bands including circumferentially extending fibers and being adapted to be loaded in circumferential tension by the radial expansion of the annular members, whereupon such radial expansion is restricted and the blades are retained securely in the blade retention slots.

\* \* \* \* \*